(12) United States Patent  
Kang

(10) Patent No.: US 7,450,115 B2  
(45) Date of Patent: Nov. 11, 2008

(54) SYSTEM FOR EFFICIENTLY INTERFACING WITH DISPLAY DATA INTERSYSTEM

(75) Inventor: Hae Yong Kang, Seoul (KR)

(73) Assignee: C & S Technology Co., Ltd., Seoul (KR)

( * ) Notice: Subject to any disclaimer, the term of this patent is extended or adjusted under 35 U.S.C. 154(b) by 481 days.

(21) Appl. No.: 10/917,155

(22) Filed: Aug. 12, 2004

(65) Prior Publication Data

US 2005/0041158 A1 Feb. 24, 2005

(30) Foreign Application Priority Data

Aug. 13, 2003 (KR) .............. 10-2003-0055944

(51) Int. Cl.  
*G06F 3/038* (2006.01)

(52) U.S. Cl. .................. 345/204; 345/87; 345/690

(58) Field of Classification Search ............ 345/204, 345/87, 690; 348/14.02; 710/14  
See application file for complete search history.

(56) References Cited

U.S. PATENT DOCUMENTS 6,848,011 B2 * 1/2005 Park et al. ............... 345/204  
7,123,283 B2 * 10/2006 Park ...................... 348/14.02

* cited by examiner

*Primary Examiner*—Kevin M Nguyen  
(74) *Attorney, Agent, or Firm*—Harness, Dickey & Pierce, PLC

(57) ABSTRACT

The system efficiently interfaces with display data using a single-chip module consisting of a Micro-Processor Unit (MPU) and a video CODEC. GUI data and video data are effectively displayed through LCD interfaces, respectively equipped in both of MPU and video CODEC, when two individual chips of MPU and video CODEC are incorporated into a single-chip module. The MPU and video CODEC may each be equipped with their own LCD interfaces. Thereby, GUI data of MPU and decoding video data of video CODEC are transmitted out to an external LCD driver for performing a display. The system for interfacing with display data is available for various multimedia applications, since a display of video CODEC and MPU can be more efficiently and freely performed through the method of data transmission using a LCD interface commonly supported by a MPU.

1 Claim, 4 Drawing Sheets

SYSTEM FOR EFFICIENTLY INTERFACING WITH DISPLAY DATA INTERSYSTEM

BACKGROUND OF THE INVENTION

1. Field of the Invention

The present invention relates to a system for efficiently interfacing with display data using a single-chip module consisting of a Micro-Processor Unit (MPU) and a video CODEC. More specially, it relates to a technology of effectively displaying GUI data and video data through LCD interfaces, respectively equipped in both of MPU and video CODEC, when two individual chips of MPU and video CODEC are incorporated into a single-chip module.

2. Description of the Related Art

Recently a system composed of a MPU and a video CODEC is used for a multimedia application. It is required for more various applications to process a large amount of GUI data generated in a MPU and video data generated in a video CODEC. Namely, a low transfer rate between a MPU and a video CODEC makes a lot of troubles in efficiently displaying various GUI data and decoding video data through an interface between them.

Therefore, it is required to properly interface between a MPU and a video CODEC in order to efficiently display GUI data of MPU and decoding video data of video CODEC in a multimedia application using a MPU chip and a video CODEC chip.

There are two methods to perform a display. The first method is to make a display through an external input/output (I/O) as shown in FIG. 1 and the second one is to perform a display by using a specific video interface chip as illustrated in FIG. 2. Herein, a main body for displaying video data and GUI data could be a MPU or a video CODEC in video display.

FIG. 1 is a block diagram designed with a video CODEC as a main body for displaying. Display data like GUI data is generally transmitted from a Micro Processor Unit (MPU) 10 to video CODEC 20 through an external I/O interface in order to display GUI data generated in a MPU. General reference numeral 30 in FIG. 1 denotes a LCD driver.

Herein, the MPU 10 saves GUI data in a display memory inside a video CODEC 20 through an external I/O interface and then perform a display.

When a MPU 10 acts as a main body for displaying, a display is performed by transmission of decoding video data generated in video CODEC 20 through an external I/O interface. Moreover, simultaneous display of display data transmitted from a MPU 10 and video CODEC 20 is performed by using a proper interface inside a video CODEC 20.

FIG. 2 illustrates that a display is made through using a specific video interface chip. A display is performed by CYPRO 40, supporting an external I/O interface to MPU 10 and CCIR656 interface to video CODEC 20, among specific video interface chips.

As mentioned above, a conventional system configured in FIG. 1 causes a problem of low transfer rate in transmitting a large amount of decoding video data of video CODEC and GUI data of MPU. Namely, much access time is required for a MPU to access a video display memory inside a video CODEC through an external I/O. Therefore such low transfer rate causes a degradation of performance of video CODEC and seriously restrictive factors putting limitation on multimedia application.

A system using an extra video interface chip shown in FIG. 2 can solve a problem of low transfer rate of a system in FIG. 1, but consequently requires a raise of cost for a specific video interface chip. Therefore, a video interface chip is losing competitiveness in performance and cost, and very restrictively used in a specific multimedia application. Similarly a MPU interface is restrictive to a specific portion of general micro-processor units, which causes limitation in selecting a MPU.

SUMMARY OF THE INVENTION

It is an object of the present invention to provide an interface to a system consisting of a MPU and a video CODEC for efficiently displaying GUI data and video data, and consequently being applicable to various multimedia applications.

In fulfillment of the objective described above, the present invention provides a system for efficiently interfacing with display data using a single-chip module consisting of a MPU and a video CODEC, respectively equipped with their own LCD interfaces each. Thereby, GUI data of MPU and decoding video data of video CODEC are transmitted out to an external LCD driver for performing a display.

DETAILED DESCRIPTION OF THE EMBODIMENTS

Hereinafter, the structures and the operation procedures of the exemplary embodiments of the present invention are described in detail with reference to the attached drawings.

Generally a Micro-Processor Unit (MPU) supports various peripheral devices. A MPU, containing a LCD controller as a internal peripheral device, supports a LCD interface for various displays in diverse multimedia applications.

Meanwhile, an interface supported by a LCD controller in all Micro-Processor Units has almost the same interface pins for clock, HSYNC, VSYNC, LCD data, etc. And timing waveforms for an interface with external LCD driver are also similar.

According to the present invention, it is designed to control the interface timing depending on specific maker. Namely, information on the interface timing of LCD driver depending on each individual maker is initially set up in the register inside a video CODEC, whereby a LCD interface is performed referring to setting value of LCD timing.

Furthermore, when an interface with a video CODEC is performed through a LCD controller incorporated in a MPU, a MPU can overcome the problems such as inefficient data transmission through internal memory access inside a video CODEC and external I/O, and a degradation of performance of video CODEC.

The present invention is described in detail in the following.

Figure 1:
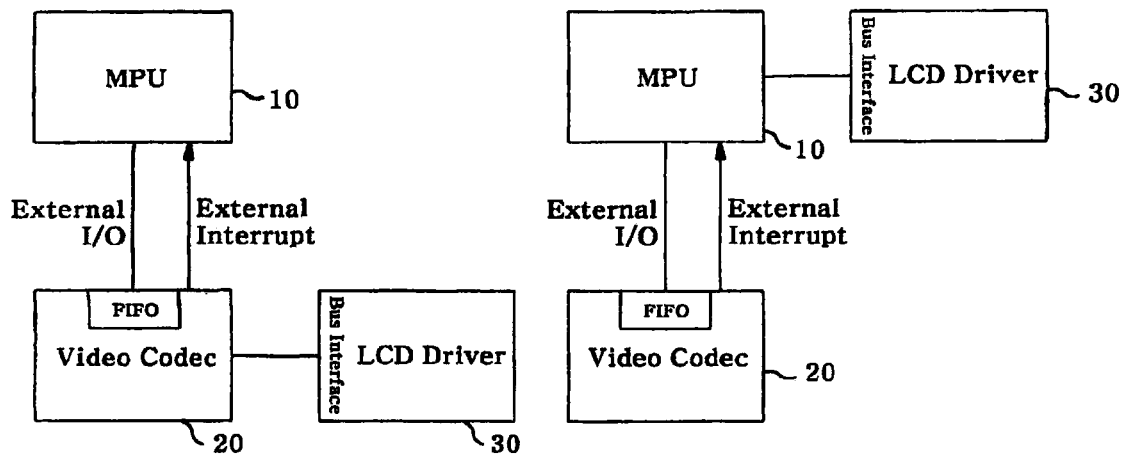
FIG. 1 is a block diagram depicting a conventional video data display using an external I/O between a MPU and a video CODEC.
Figure 2:
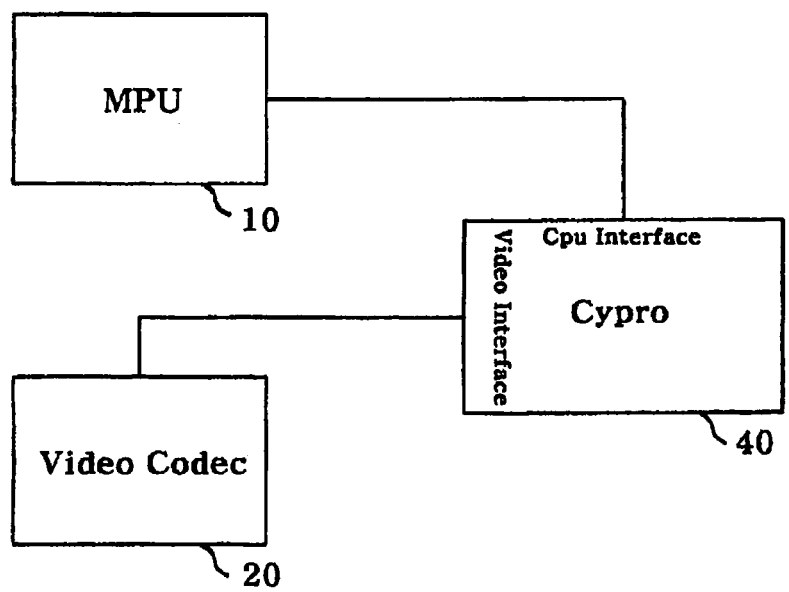
FIG. 2 is a block diagram depicting a conventional video data display using a video interface chip.
Figure 3:
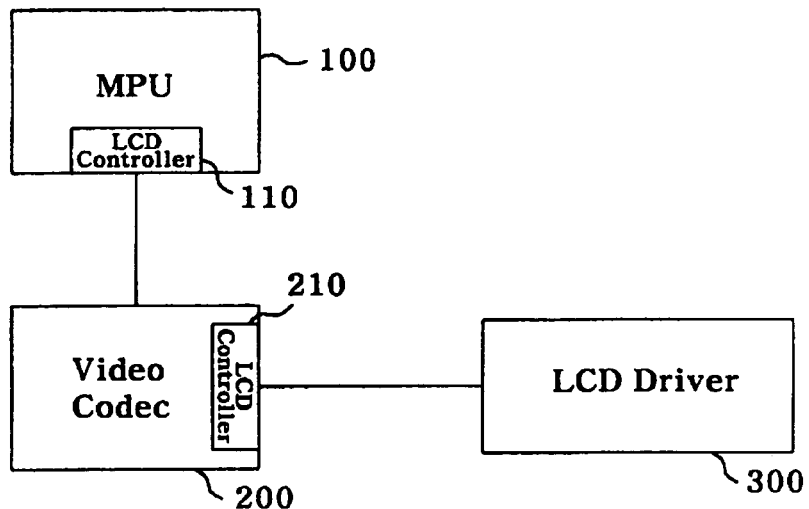
FIG. 3 is a block diagram depicting a system composed of a MPU and a video CODEC in accordance with the present invention.

When two chips of a MPU and a video CODEC are incorporated into a single-chip module as shown in FIG. 3, a video CODEC requires an interface and internal blocks as the following.

A video CODEC includes three internal blocks, i.e., a block of receiving data such as GUI transmitted from a MPU 100, a block of transferring display data from a video CODEC 200 to an external driver 300, and a block of processing GUI data transmitted from a MPU 100 and decoding data generated in a video CODEC 200 for simultaneously displaying.

First, a block of receiving data such as GUI transmitted from a MPU 100 effectively transfers data using a LCD interface in a video CODEC 200. Data such as GUI generated in a MPU 100 for a display are outputted through a LCD controller 110 constructed inside a MPU 100. Herein, a video CODEC 200 receives video data such as GUI transferred from a MPU 100 as a input signal of a video CODEC 200.

Second, decoding data for a display is generated during a decoding process inside a video CODEC 200. A video CODEC 200 includes a LCD controller 210 inside for outputting such decoding data.

Figure 4:
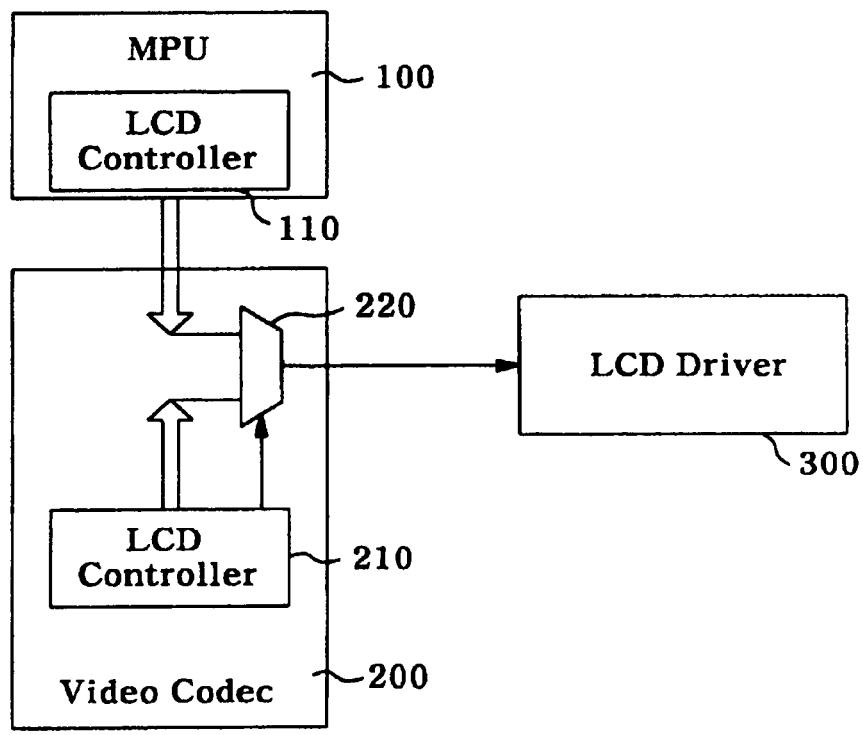
FIG. 4 is a block diagram depicting a LCD interface inside a video CODEC in accordance with the present invention.

The third one is a block of performing a process of LCD interface for simultaneously displaying GUI data transmitted from a MPU 100 and decoding data generated in a video CODEC 200. The details are shown in FIG. 4. When a video CODEC 200 performs a display with an external LCD driver 300, data displayed by a video CODE 200 are divided into three types. The first one is to display the only data like GUI generated in a MPU 100. The second case is that just data decoded inside a video CODEC 200 are displayed. The last one is GUI data generated in a MPU 100 and decoding data generated in a video CODEC 200 are simultaneously displayed.

The video data such as GUI generated are inputted from a LCD controller 110 equipped inside a MPU 100 to a video CODEC 200 through LCD interface pin. Namely, a video CODEC 200 is designed to receive HSYNC, VSYNC and LCD data from a LCD controller 210. To directly perform a display with the input data, a video data path is made by selecting data transmitted from a MPU 100 in a multiplexor 220.

In a second case, video decoding data generated inside a video CODEC 200 are displayed. Displaying data generated in a video CODEC 200 is performed by selecting data generated in LCD controller 210 inside a video CODEC 200 in a multiplexor 220 as the first case.

Figure 5:
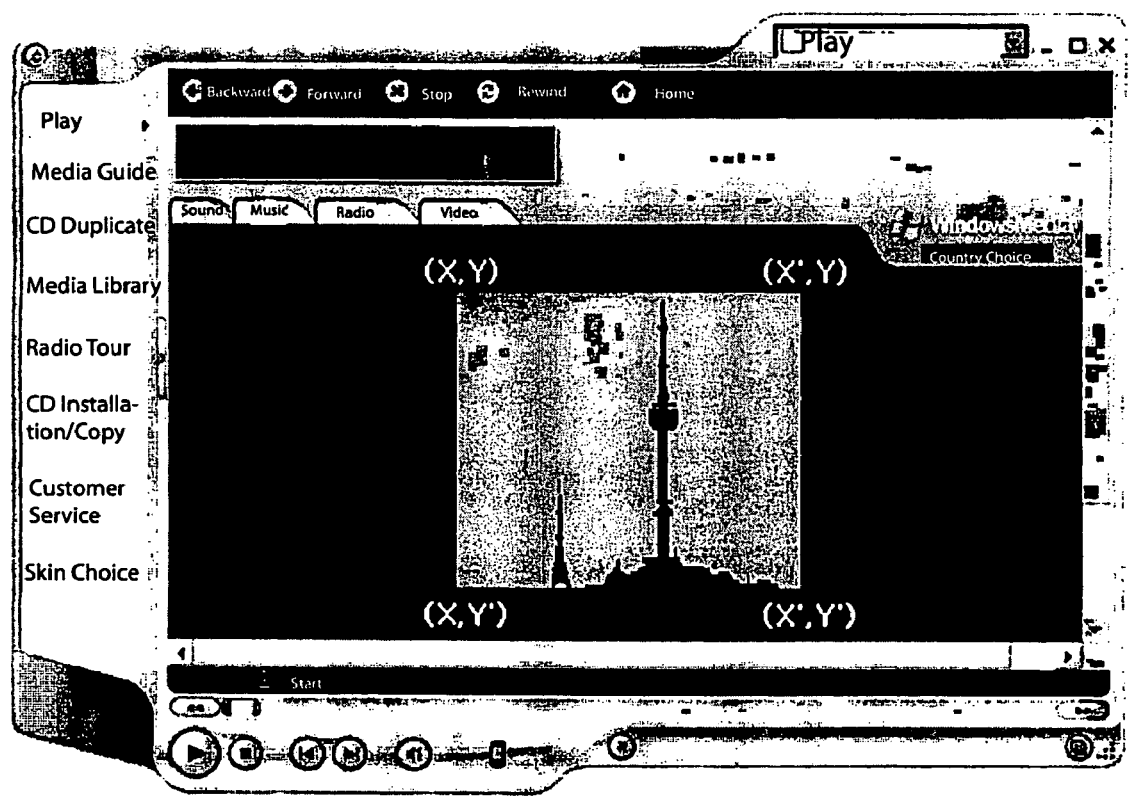
FIG. 5 is a representation showing an embodiment of a screen for displaying GUI data of MPU and decoding data of video CODEC in accordance with the present invention.

The last one is that the GUI data generated in a MPU 100 and video decoding data generated inside a video CODEC 200 are simultaneously displayed. For performing a display as shown in FIG. 5, a MPU 100 requires a process of initialization in a simultaneous display. A MPU assigns a display position of video decoding data generated in a video CODEC to a video CODEC, which refers to a coordinate of pixel in displaying.

As shown in FIG. 5, coordinates of (X,Y) and (X',Y') of decoding data generated in a video CODEC can be predicted by a MPU in advance. Therefore, a MPU saves coordinates of (X,Y) and (X',Y') at the prescribed register inside a video CODEC, wherein the saved value of pixel is used as a criterion to choose between data of a MPU or data inside a video CODEC.

Display process is like the following.

GUI data generated in a MPU is transferred to a video CODEC from the first pixel through a LCD controller. Meanwhile, a multiplexor 220 inside a video CODEC 200 activates data bus of GUI, etc. transferred from a MPU 100 for performing a display, as shown in FIG. 4.

A display of GUI data transferred from a MPU proceeds through such display process up to the saved coordinate of (X,Y) of pixel. When a display position becomes the coordinate of (X,Y), a multiplexor activates bus of video decoding data transferred from a LCD controller inside a video CODEC to perform a display.

At the coordinate of (X',Y), activation of LCD controller bus inside a video CODEC gives rise to performance of a display by converting display data transferred from a video CODEC to GUI data to be transmitted to a MPU. In the section of displaying video data decoded by a video CODEC, output data of a LCD controller in a MPU are ignored.

A display is perfectly performed by repeating the steps described above. Consequently, a MPU performs a display in a specific region for GUI data of a MPU and a video CODEC performs a display process in a specific region for decoding data generated in a video CODEC.

By simple selection of multiplexor with reference to the pre-assigned coordinate of a video CODEC display inside a video CODEC, a MPU effectively performs a display without access of video display memory inside a video CODEC, whereby the performance of a video CODEC is accordingly not degraded.

Figure 6:
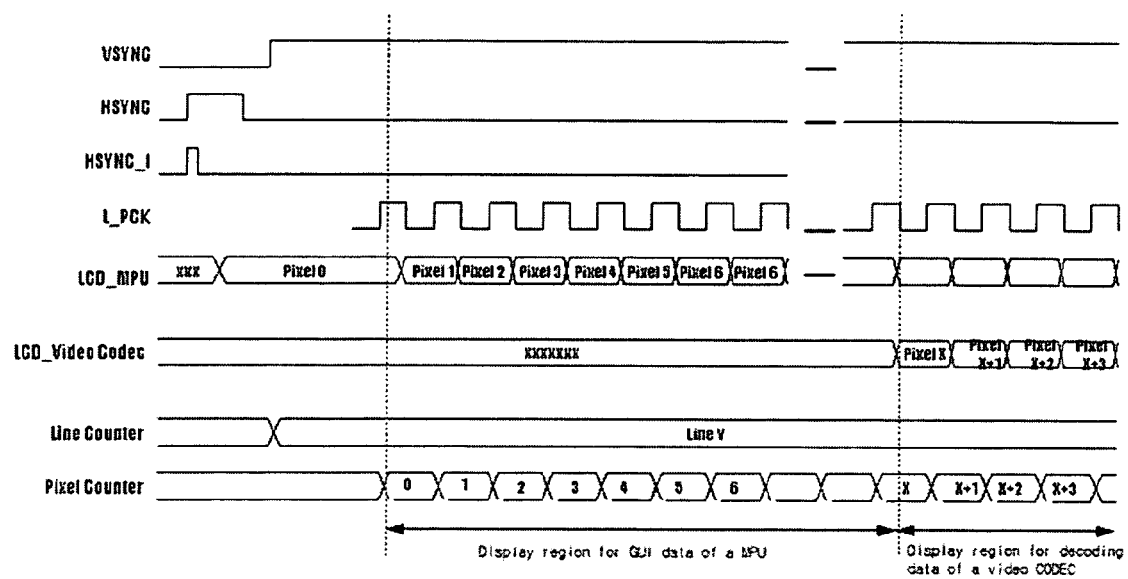
FIG. 6 is a timing diagram depicting a transmission of GUI data of a MPU and decoding data of a video CODEC in accordance with the present invention.

FIG. 6 is showing a timing waveform in simultaneously displaying GUI data of a MPU and decoding data inside a video CODEC.

Pixel counter counts the number of pixel using L_PCK (LCD Interface Clock) transferred from a MPU with reference to the coordinate of video CODEC display initially transmitted from a MPU. The number of lines also is counted using L_PCK. At present, data bus of LCD_MPU originated from a MPU is transferred to an external LCD driver, which has the same effect as a direct transmission from a LCD controller of a MPU to an external LCD driver has.

At the coordinate of (X,Y) of video CODEC display initially saved, a data line of LCD_MPU (GUI data inside a MPU) is changed to one of LCD_video CODEC (decoding data inside a video CODEC) as shown in FIG. 6. Namely, a display is performed with GUI data transmitted from a MPU and then decoding data inside a video CODEC.

As described above, the display position of a video CODEC is perfectly expected by correct processes of a pixel counter and a line counter according to I_PCK, that is a clock transferred from a MPU. Besides, a multiplexor realizes a perfect interface with an external LCD driver with reference to a bus control.

Thus, according to the present invention, the following advantageous effects can be obtained.

A system consisting of a Multi-Processor Unit (MPU) and a video CODEC is available for various multimedia applications, since a display of data of video CODEC and MPU can be more efficiently and freely performed through the method of data transmission using a LCD interface commonly supported by a MPU.

Moreover, a MPU does not need to access a display memory inside a video CODEC, whereby a performance of video CODEC can be maximized.

Although the present invention has been described in terms of the presently preferred embodiment, it is to be understood that the disclosure is not to be interpreted as limiting. Various alternations and modifications will no doubt become apparent to those skilled in the art after having read the above disclosure. Accordingly, it is intended that the appended claims be interpreted as covering all alternations and modifications as fall within the true spirit and scope of the invention.

What is claimed is:

1. A display process, comprising:

generating GUI data in a Micro-Processor Unit (MPU);

employing the MPU to predict first and second display coordinates of decoding data generated in a video CODEC in advance of transfer of GUI data from the MPU to the video CODEC;

employing the MPU to save the predicted display coordinates at a prescribed register inside the video CODEC;

employing the first and second predicted display coordinates as criteria to choose between GUI data of the MPU and display data inside the video CODEC by:

(a) operating a multiplexer inside the video CODEC to selectively activate, according to the predicted display coordinates, a data bus operatively connected to transfer the GUI data from the MPU to the video CODEC through an LCD controller inside the MPU for performing a display; and (c) operating the multiplexer to selectively activate, according to the predicted display coordinates, another data bus operatively connected to transfer the display data inside the video CODEC through an LCD controller inside the video CODEC for performing the display.

* * * * *